United States Patent [19]

Salete-Garces

[11] 4,357,864

[45] Nov. 9, 1982

[54] PNEUMATIC GRAIN CONVEYANCE RICE MILL

[76] Inventor: Felipe Salete-Garces, Avenida Ano de Juarez 198, Granjas San Antonio, Iztapalapa, Mexico, 13, D.F.

[21] Appl. No.: 166,878

[22] Filed: Jul. 8, 1980

[30] Foreign Application Priority Data

Jul. 10, 1979 [MX] Mexico .................................. 178410

[51] Int. Cl.[3] ............................................... A23N 5/00

[52] U.S. Cl. ........................................ 99/484; 51/149; 51/156; 99/518; 99/600; 99/609; 99/618; 99/620; 99/621; 99/623

[58] Field of Search .......... 99/484, 488, 516, 518-522, 99/524-526, 528, 600-623, 626, 629; 51/149, 156; 209/366.5, 367; 406/94; 55/261, 282

[56] References Cited

U.S. PATENT DOCUMENTS 3,924,899 12/1975 Salete .................................... 406/94
4,167,478 9/1979 Salete ................................ 209/366.5
4,251,243 2/1981 Salete-Garces ....................... 55/282

FOREIGN PATENT DOCUMENTS 2706837 2/1977 Fed. Rep. of Germany ........ 99/518

*Primary Examiner*—Philip R. Coe
*Assistant Examiner*—Timothy F. Simone
*Attorney, Agent, or Firm*—Sughrue, Mion, Zinn, Macpeak & Seas

[57] ABSTRACT

A rice mill comprising grain feed means, grain husking means connected to said grain feed means, paddy removing means connected to said grain husking means, first grain elevating means connected to said paddy removing means, grain polishing and whitening means connected to said first grain elevating means, second grain elevating means connected to said polishing and whitening means, grain classifying means connected to said second grain elevating means, bin means connected to said grain classifying means, and pneumatic cyclonic separating means for removing light materials from said paddy removing means, said grain husking means, said polishing and whitening means, and said grain classifying means, is rendered capable of full pneumatic conveyance of the grain by the provision of first, second and third grain decelerating and abrading sifter means at the entrances of said grain husking means, said grain polishing and whitening means and said grain classifying means, respectively, and sieve means between each said first and third grain decelerating and abrading sifter means and said grain husking means and said grain classifying means, respectively, said first grain feed means and said first and second grain elevating means being pneumatic conveying means.

13 Claims, 14 Drawing Figures

PNEUMATIC GRAIN CONVEYANCE RICE MILL

BACKGROUND OF THE INVENTION

1. Field of the Invention

The present invention refers to rice mills and, more particularly, it is related to a fully pneumatic rice mill having means for the pneumatic coneyance of both the grain and the by-products and waste materials.

2. Description of the Prior Art

Rice mills constitute a very well known type of equipment and generally comprise grain feed means, grain prehusking means connected to said grain feed means, grain husking means connected to said grain prehusking means, husk removing means connected to said grain husking means, paddy removing means connected to said husk removing means, grain polishing and whitening means connected to said paddy removing means, grain classifying means connected to said polishing and whitening means and bin means connected to said classifying means, as well as grain elevating means for conveying the grain from one of the units to the other and pneumatic cyclonic separating means for removing light materials from the various pieces of equipment described above.

Rice mills are generally arranged in several floors, whereby the cycle of manufacture involves the elevation of grain several times from the ground floor to the top or intermediate floors, inasmuch as in the normal arrangement of rice mills, the grain prehusking means are at the upper floor, the grain husking means and husk separating means are at the intermediate floor and the paddy removing means are at the lower floor, and thereafter the grain polishing and whitening means are again arranged at the intermediate floor, and the grain classifying means are also arranged at the intermediate floor, whereas the bin means for collecting the grains already classified are arranged between the intermediate and the ground floor.

As the grain feed means comprises a receiving hopper generally located underground, it is necessary to elevate the grains from said feed means to the top floor and, for this purpose, as well as for the purpose of elevating the grain from the paddy removing means to the grain whitening and polishing means and thereafter to again elevate the grain from the whitening and polishing means to the grain classifying means, suitable elevators become necessary. In prior art rice mills, bucket type elevators are normally used, inasmuch as it has been considered up to the present time that by using pneumatic conveyors for elevating the grain, the speed achieved by said grain when discharged into the various respective pieces of equipment is so great that a very large proportion of breakage occurs, which renders pneumatic conveyors quite inadequate for transporting the grain within a rice mill.

For instance, a well known prior art rice mill, such as the Schule Burma mill, manufactured by Schule AG, of Germany, generally uses a group of bucket elevators to elevate the grain, particularly when several stages of prehusking, husking and whitening and polishing machines are used, whereby the grain is always picked up at the bottom of the mill by the bucket elevators and is discharged at the top, to be distributed among the various pieces of equipment, so as to avoid unduly high speeds of the grain when reaching the mechanical parts of the machines, thus avoiding a large proportion of breakage. Also, another very well known prior art rice mill such as the Satake rice mill, manufactured by Satake Engineering Co., Ltd. of Japan, also uses large capacity bucket elevators having distributing bins on the top, in order to distribute the grain amongst the various pieces of equipment, and several of such large capacity bucket elevators are installed throughout the mill in order to achieve the movement of the grain as necessary.

One other very well known type of mill is the Remo mill manufactured in Mexico by Refaccionaria de Molinos, S.A. In this type of mill, also a group of bucket elevators is used in order to convey the grain from the equipment installed at the ground floor up to the equipment installed at the intermediate or top floors, so as to accomplish the same goal stated above.

All the well known prior art mills, such as the three above described mills manufactured by Schule AG, Stake Engineering Company, Limited and Refaccionaria de Molinos, S.A., use bucket type elevators for the grain, because again, it has been considered up to the present time that the pneumatic conveyance of the grain causes serious problems and a large proportion of breakage when the grain reaches a relatively high velocity at the different pieces of equipment wherein it violently impacts against the mechanical parts of such equipment, thus breaking and producing a large proportion of reject grain.

While all rice mills known in the prior art do contain pneumatic conveyance means, these pneumatic conveyance means are restricted merely to the by-products and waste materials, namely, to remove the husk from the husk removing means, to remove the dust and husk from the grain husking means, to remove the flour and bran produced in the grain whitening and polishing means, to remove flour from the grain classifying means and also from the bin means for storage of the grain already fully treated by the mill. However, as mentioned above, these pneumatic means have been restricted only to the by-products and waste materials and have not been applied up to the present time to the conveyance of the grain itself, in view of the above mentioned drawback.

Therefore, for long it has been sought to solve the above problem, because pneumatic conveyance is a highly efficient and economic means of transporting the grain within a rice mill, with a consumption of only a fraction of the energy consumed by the traditional bucket type elevating means, whereby numerous efforts have been made to try to adapt pneumatic conveyor systems for conveying the grains in a rice mill, without much success, however, up to the present date.

The problem of grain breakage in pneumatic conveyors used in rice mills, therefore, has remained up to the present date without any plausible solution, and all rice mills in existence in the present market use bucket type elevators for conveying the grain from one section to another, without any effort having been made to adapt any type of pneumatic conveyor for the conveyance of the grain itself. The pneumatic systems which have been used have been restricted to the by-products and waste materials such as flour, bran, husk, dust and the like.

SUMMARY OF THE INVENTION

Having in mind the defects of the prior art rice mills, it is an object of the present invention to provide a fully pneumatic rice mill which is of a very simple and economical construction, of low maintenance cost and yet of very high efficiency.

It is another object of the present invention to provide a fully pneumatic rice mill of the above mentioned character, which in view of the selection of special machinery, will result in a highly compact yet high capacity mill.

One other object of the present invention is to provide a fully pneumatic rice mill of the above described character, which will be capable of containing a minimum number of treatment units whereby it will be rendered capable of being worked at the site of the crop by the farmers themselves.

Another object of the present invention is to provide a fully pneumatic rice mill of the above indicated nature, which will comprise means for decelerating and abrading and at the same time sifting the incoming grains, whereby to admit pneumatic conveyors imparting a high velocity to the grain.

Still one other object of the present invention is to provide a fully pneumatic rice mill of the above mentioned character, which will be capable of arrangement of the various units forming the same either vertically in several floors or horizontally in one single floor.

A more particular object of the present invention is to provide a fully pneumatic rice mill which will completely avoid the use of bucket type elevators for elevating the grain from one unit to the next.

Another and still more particular object of the present invention is to provide a fully pneumatic rice mill capable of classifying various sizes of grains in order to satisfy the more strict markets for rice.

Another object of the present invention is to provide a fully pneumatic rice mill wherein all the conveyance of the grain and of the by-products and waste materials is effected by means of high speed pneumatic conveyors either of the induction type or of the positive pressure type.

Still another object of the present invention is to provide a fully pneumatic rice mill of the above described nature, which will be capable of being operated, as regards its pneumatic conveyors, either by a high pressure positive action pump or by a blower acting as an inductor or as a pressure pump.

The foregoing objects and other objects ancillary thereto are preferably accomplished as follows.

In a rice mill comprising grain feed means, grain husking means connected to said grain feed means, husk removing means connected to said grain husking means, paddy removing means connected to said husk removing means, first grain elevating means connected to said paddy removing means, grain polishing and whitening means connected to said first grain elevating means, second grain elevating means connected to said grain polishing and whitening means, grain classifying means connected to said second grain elevating means, bin means connected to said classifying means, and pneumatic cyclonic separating means for removing by-products and waste materials from the paddy removing means, the grain husking means, the grain polishing and whitening means and the grain classifying means, a full pneumatic conveyance of the grain is provided by incorporating a first, a second and a third grain decelerating and abrading sifting means at the entrances of said grain husking means, said grain polishing and whitening means and said grain classifying means, respectively, and sieve means between each said first and third grain decelerating and abrading sifting means and said grain husking means and said grain classifying means, respectively, with said first grain feed means and said first and second grain elevating means being pneumatic conveying means.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of certain specific embodiments, when read in connection with the accompanying drawings, in which:

DETAILED DESCRIPTION

Figure 1:
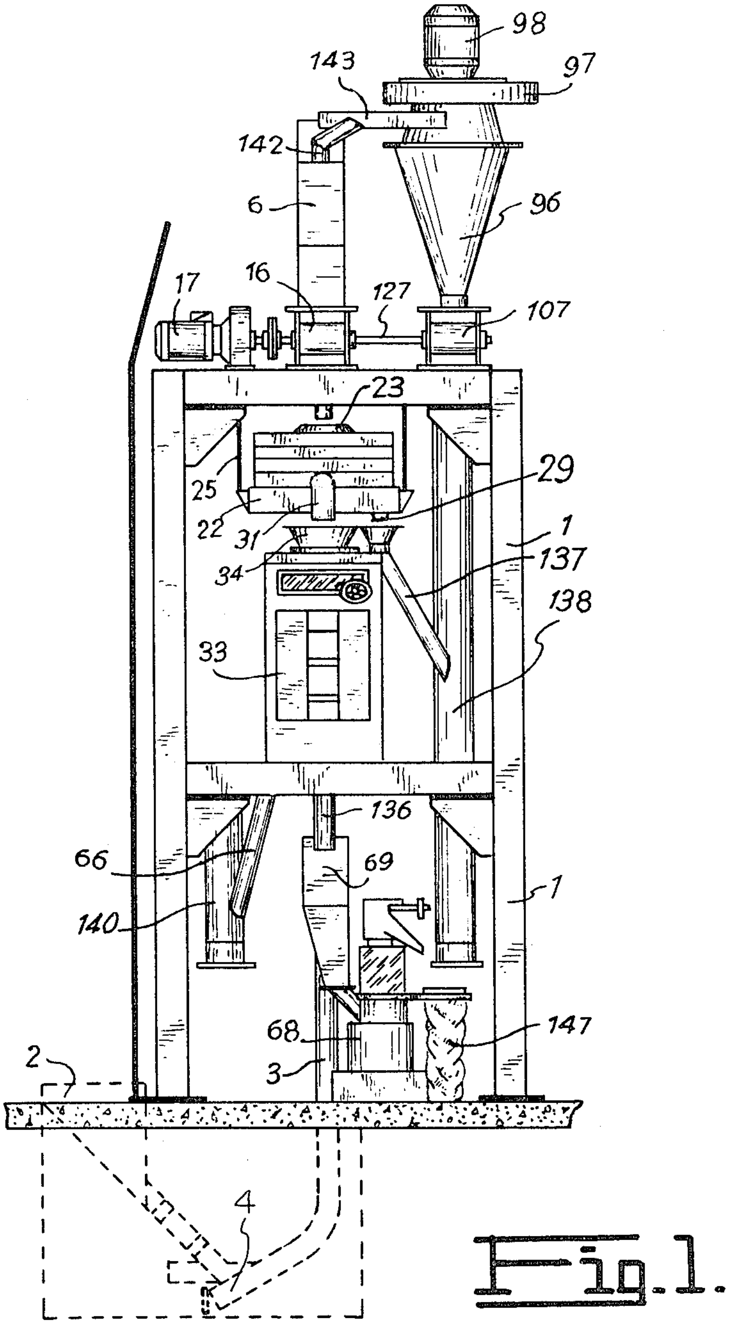
FIG. 1 is a front elevational view of a highly simplified fully pneumatic rice mill adapted to be worked at the site of the crop and built in accordance with one embodiment of the present invention.
Figure 2:
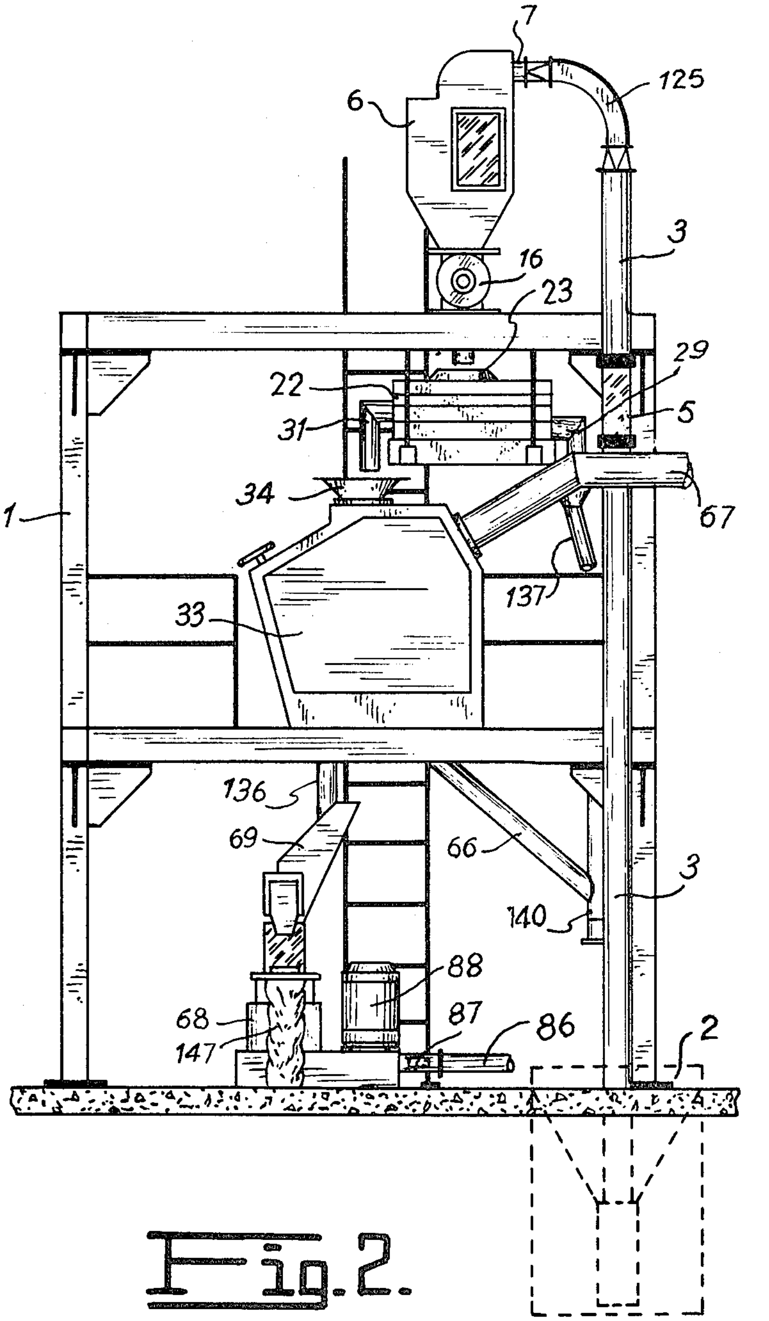
FIG. 2 is a side elevational view of the rice mill illustrated in FIG. 1 and taken at an angle of 90° with respect thereto.

Having now more particular reference to the drawings and more specifically to FIGS. 1 and 2 thereof, there is shown a highly simplified type of rice mill using exclusively pneumatic means for the conveyance of both the grain and the by-products and waste materials and comprising a metal frame structure 1 for supporting all the units constituting the mill, an underground feed hopper 2 to receive the unhusked rice or paddy, a lift duct 3 which may be built so as to contain a suitably distributed plurality of antichoke valves such as the one shown in dotted lines at the bottom of FIG. 1 and built in accordance with U.S. Pat. No. 3,924,899 granted to the same applicant hereof. The lift duct 3 is also preferably provided with a transparent section 5 which permits inspection of the grain being lifted through said lift duct 3. Duct 3 is connected, at its upper end, with an elbow member 125 which is of a rectangular cross-section, said section varying from a square section at the point connecting the duct 3 to a horizontally elongated rectangular section increasing in width and having a constant height in order to form a funnel-like fitting which matches the entrance 7 of the grain decelerating and sifting unit 6 which will be described in more detail in connection with FIG. 6.

The grain decelerating and abrading sifting unit 6, which will be called hereinafter sifter for purposes of simplicity, acts as a prehusker and sifter for the incoming raw paddy. Sifter 6 receives the grain from the lift duct 3 through elbow member 125 and discharges the grain into a rotative air separator 16 actuated by means of a shaft 127 coupled to an electric motor 17 as shown in FIG. 1 of the drawings. The air separator 16 is of a very well known type, such as that illustrated at the bottom of FIG. 6 by the reference character 16. The air separator comprises a plurality of rotating paddles which form receiving hoppers between each pair thereof, thus discharging radially and at a constant rate the grain accumulated therein through rotation of said hoppers in order to deliver the grain to the lower outlet of the apparatus.

Directly below the outlet of the air separator 16, a vibrating sieve 22 is arranged by freely hanging the same from frame 1 by cables 25. Said sieve has an open mouth 23 of a frustoconical form in order to permit the overflow of surplus grain so as to avoid choking of the sieve 22 when the air separator 16 delivers excess grain into the mouth 23. Sieve 22 comprises an outlet 29 for husk and other waste materials which are delivered through duct 137 to deposit 138 for appropriate disposal, and another outlet 31 for clean grain which delivers the grain to the hopper 34 of a grain husker 33. Hopper 34 is open upwardly and receives the grain by gravity, for the same purpose described above for mouth 23 of sieve 22, that is, to permit hopper 34 to allow overflow of surplus grain in order to prevent choking of the husker 33.

Figure 11:
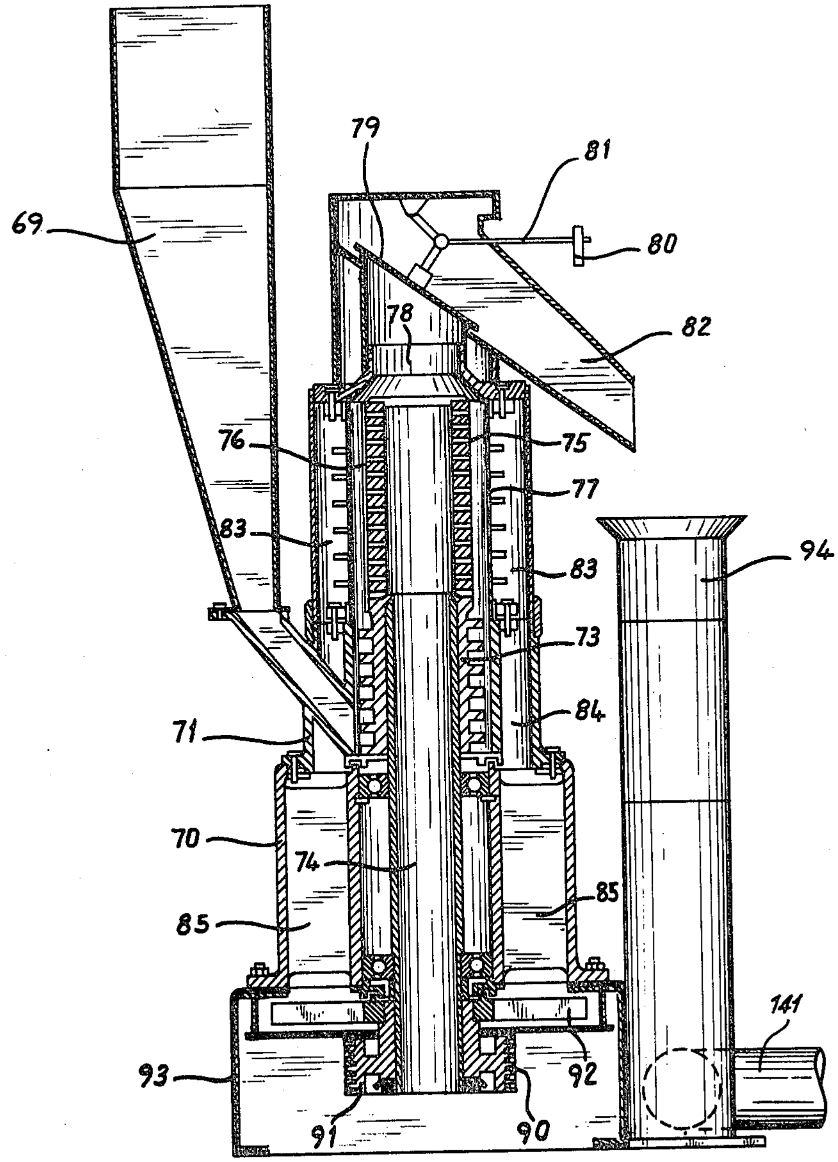
FIG. 11 is a cross-sectional elevational view of a rice polishing and whitening machine for use with the mill of the present invention and showing the inner details thereof.

As it will be described in more detail hereinbelow, the husking machine 33 separates the incoming material into several streams, namely, light particles and husk, intermediate size particles such as broken rice and the like, and wholy husked rice and unhusked paddy, duct 67 being provided in said husker for extraction of the stream of light particles and husk separated by the machine, said particles being driven by means of a fan integrally provided within the husker 33, as will be described hereinafter, in order to send them out of the husker for appropriate disposal. The intermediate size particles, in turn, are delivered from the husking machine 33 through duct 66 into suction duct 140, also for appropriate disposal. The husked rice is in turn delivered through duct 136 into hopper 69 of the grain polishing and whitening machine 68, wherein said grains are preferably furtherly husked, as well as polished and whitened. This goal may be accomplished by using a grain polshing and whitening machine per United States copending patent application Ser. No. 096,269, U.S. Pat. No. 4,292,890 applied for by the same applicant hereof, and as illustrated in FIG. 11 of the drawings, inasmuch as said machine permits the full husking of those grains that the husker 33 may have passed without being husked completely. The refined grain is delivered directly to a packaging station such as indicated by means of the bag 147, for delivery to the consumers.

Figure 12:
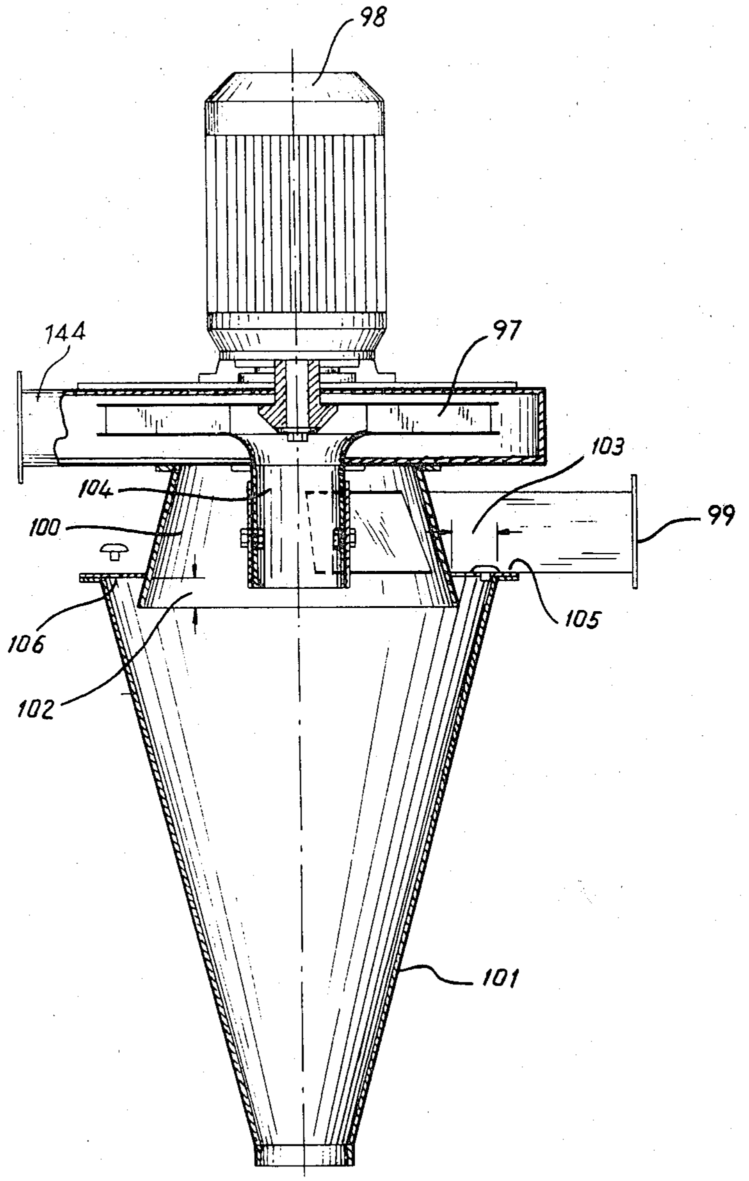
FIG. 12 is a cross-sectional elevational view of a cyclonic separator having antiadherence means, preferred for use with the rice mill of the present invention.

The above described sifter 6 is connected, by means of a pipe 142 and a duct 143 tangentially to the pneumatic cyclonic separator 96, which may be of any suitable type but which preferably is as the one described and claimed in United States copending patent application Ser. No. 128,785, applied for by the same applicant hereof and as shown in FIG. 12 of the drawings. Said cyclonic separator has an induction fan 97 and an electric motor 98, in order to induce a stream of air to remove all the dust and husk coming from the sifter 6. Said husk and dust are separated from the air in the cyclon 96 and run down the lower cone thereof. An air separator 107 similar to the air separator 16 described above, is provided at the bottom of cyclon 96 for receiving said husk and dust and, through the action of the same shift 127 driven by motor 17, said air separator 107 delivers the husk and dust into the duct 138 wherein also the waste particles from sieve 22 may be received through pipe 137, for appropriate disposal.

The flour and bran produced by the action of the grain polishing and whitening machine 68, are delivered through duct 86 containing a relief valve 87, to be conveyed pneumatically to another place in the premises for appropriate treatment and packaging.

The highly simplified rice mill built in accordance with the first embodiment of the invention illustrated in FIGS. 1 and 2 has been made possible in view of the incorporation of sifter 6 and the association of said apparatus with the freely hanging vibration sieve 22, a husker machine 33 and a specially designed grain whitening and polishing machine 68 which is capable of completing the husking operation that is usually incompletely effected in the husker 33 described above.

For the purpose of describing in detail the various units forming the rice mill built in accordance with the first embodiment of the invention illustrated in FIGS. 1 and 2, reference will now be made to FIG. 6 wherein the sifter 6, which forms a very important part of this invention, is clearly illustrated as comprising an outer housing having an elongated rectangular inlet 7 for grain pneumatically conveyed by means of the lift duct 3 and through the elbow member 125 as described above. Within the housing, a pair of plates 9 and 10 are arranged at a level slightly below the lower edge of inlet 7, plate 10 being fixed and plate 9 being movable in order to change its slopping angle by the action of a lever 11 located outwardly of the housing of the apparatus. Plates 9 and 10 together with the top of the housing provide a rectangular horizontally elonated channel-like inlet for the grain entrained by the air forced by the pneumatic system and force the stream of air and entrained grain to move along the curved surface of a plate 8 lined with an abrasive material, the curvature of plate 8 being such that the grain leaving the passage formed between plates 9 and 10 and abrasive plate 8 will not directly impact against said plate 8 but rather will slide smoothly thereon in a movement following the curvature of plate 8, wherein the grain is heavily abraded without any appreciable breakage because there is no direct impact of the grain against the plate 8, but only a high degree of abrasion caused by the high speed of the grain entering into the sifter against the abrasive surface of plate 8 clearly illustrated in FIG. 6 of the drawings. The grain is then heavily decelerated both by the friction thereof against the abrasive surface of curved plate 8, and by the reduced elongated inlet provided by plates 8, 9 and 10. The abraded grain is thereafter discharged on an opposite curved plate 12 also lined with abrasive material and from there the grain is again discharged over a further opposite curved plate 13, and so forth against a plurality of plates which form a cascade of the grain, which ultimately falls downwardly into the paddles of the air separator 16 described above, for discharge from the sifter. The air which originally entrains the grain, sifts the same by sweeping through said cascading arrangement and, together with the husk and dust removed therefrom by the abrasive surfaces of plates 8, 12, 13, and so forth, is suctioned through the upper duct 142 of the sifter, to be furtherly treated in the cyclonic separator 96 described above.

Figure 6:
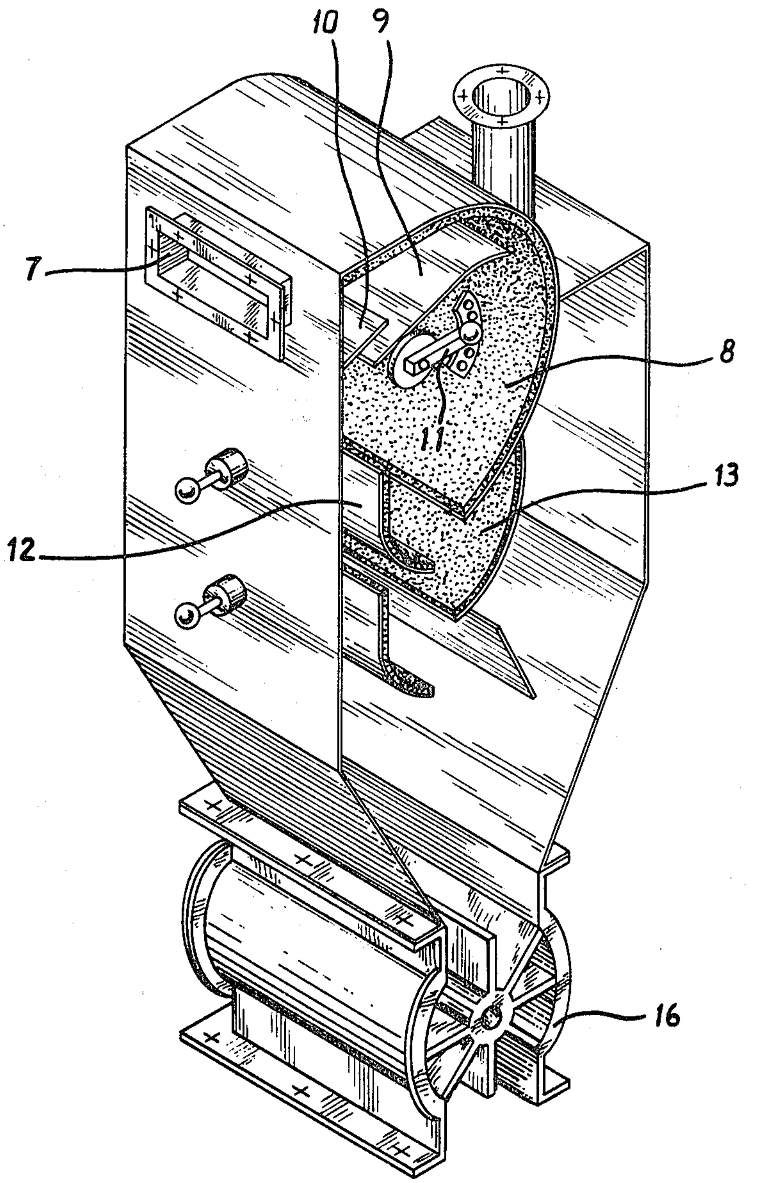
FIG. 6 is a partially cut-away perspective view of a grain decelerating and abrading sifting means for use with the mill in accordance with any one of the embodiments of the present invention, and showing the inner details thereof.

By the incorporation of the sifter 6 shown in detail in FIG. 6, it will be clearly seen that the mill built in accordance with the present invention is fully capable of pneumatic conveyance of the grain, because said grain will not impact any surface of the hard metallic elements of the mill, inasmuch as the arrangement of the plates in the sifter 6 will decelerate the grain and will separate it from the air entraining same, so that the grain will gently fall downwardly to the air separator 16 as described above.

Any time the grain in any stage of treatment is to be lifted or conveyed from one unit to the next of the mill in accordance with the present invention, this conveyance may be effected by pneumatic conveyors, because the high speed achieved by the air entraining the grain and therefore by the grain entering the units of the mill, will be cancelled by the grain decelerating action exerted by the sifters such the sifter 6, built in accordance with the present invention. Said sifters will additionally exert a prehusking action if the grain fed to the same is the paddy coming from the hopper receiving the same for treatment in the mill built in accordance with the present invention, or will exert a cleansing action when receiving partially treated grain.

The operation of the sifter is highly efficient in view of the fact that, due to the adjustability of plate 9, the thickness of the grain stream may be varied at will in accordance with the particular needs of the grain under treatment, and also in view of the fact that the grain which arrives into the sifter 6, impacts against other grains which arrived first, or simply slides on the inner surface of plate 8, whereby said grains act as a shock absorbing cushion which prevents any substantial breakage of the grains as would be the case otherwise, that is, as it would be the case should the sifter 6 be absent and the grain be directly fed, for instance, into the grain husking machine. The highly abrasive action of the plates 8, 12, 13 and so forth, in turn, rub the grain falling therethrough and remove some of the husk in the instance of the mill built in accordance with the embodiments of FIGS. 1 and 2, whereby the load of the husking machine is substantially descreased and its operation is rendered more efficient.

Figure 7:
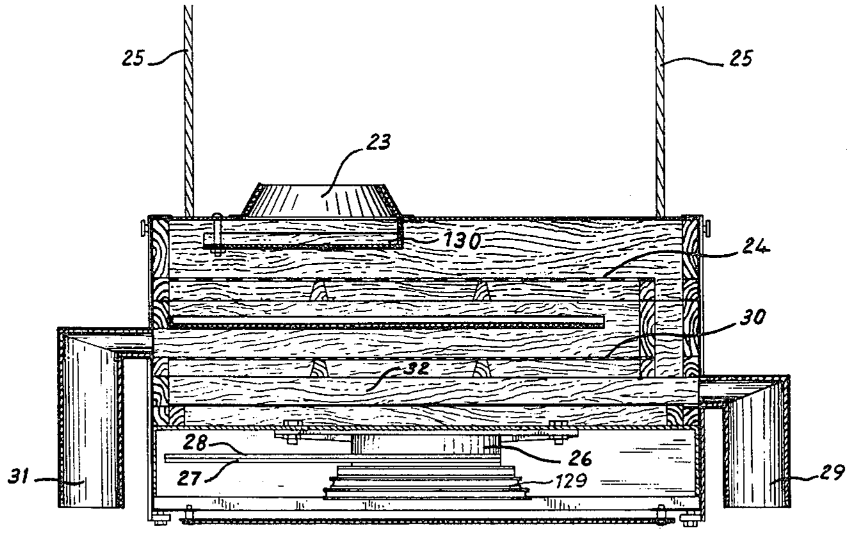
FIG. 7 is cross-sectional elevational view of one of the sieves used in any one of the embodiments of the fully pneumatic rice mill built in accordance with the present invention.
Figure 8:
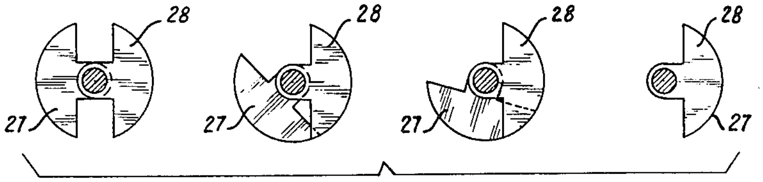
FIG. 8 is a plan view showing different positions of the weights used for effecting the vibration of the sieve illustrated in FIG. 7.

The vibrating sieve used in the mill in accordance with this embodiment of the invention is more fully illustrated in FIGS. 7 and 8 of the drawings and it may be seen that said sieve, with its mouth 23 directly below the discharge duct of separator 16, is freely hanged by means of a plurality of ropes 25, in order to permit its free vibration. The sieve built in accordance with the present invention comprises a frustoconical open mouth 23 which permits overflow of surplus grain when the capacity of the sieve is exceeded, thus avoiding any choking action within the equipment. Below said open mouth 23, a lid 130 is provided to guide the grain, by the vibrational action, towards the left as seen in FIG. 7 of the drawings. A first screen 24 is horizontally provided below the lid 130, in order to receive at the left end thereof the grain discharged by the lid 130 and, also by the vibrating action of the unit, to convey the same towards the right as shown in FIG. 7 of the drawings, the screen 24 being dimensioned such that it permits the passage of all the rice grains but retains all particles which may be larger than said grain, said larger particles falling down through outlet 29, to be disposed of as described above. The rice grains and particles smaller than the same fall through the screen 24 and the sieve in accordance with the present invention is provided with an intermediate plate for receiving the same and discharging it, at the right hand end of FIG. 7, unto a second screen 30 which retains the rice grains but permits passage of the smaller particles which are discharged through the outlet 29 at the lower level 32, whereas the grain leaves the sieve through the outlet 31 for further processing as described above.

The vibrational motion of the sieve 22 is accomplished by means of a mechanism which comprises a fixed axle 26 located at the bottom of the sieve, which supports an inner rotating shaft carrying pulley 129 driven by a suitable motor (not shown), and also carrying weight plates 27 and 28, which will rotate in unison with said pulley 129. The shape of the plates 27 and 28 is clearly shown in FIG. 8 of the drawings, and it may be seen that the amplitude of vibration of the sieve will be regulated by the arrangement of the relative positions of said plates 27 and 28, as shown in the four different positions of FIG. 8. In the first position shown, with plate 27 diametrically opposite to plate 28, no vibration is imparted to the sieve, because the plates 27 and 28 will be dynamically balanced on the shaft. If plate 27 is moved counterclockwise to the second position shown in FIG. 8, then a vibrational action is accomplished by the device, which vibrational action is increased as the plate 27 is moved counterclockwise more remotely from its diametrically opposite position to plate 28. With both plates 27 and 28 coincident as shown in the fourth position of FIG. 8, the amplitude of the vibrational action communicated to the sieve reaches its maximum.

While the grain husking machine to be incorporated in the mill according to the embodiment described in FIGS. 1 and 2 may be of any known type, and forms no important part of the present invention, it is preferred to use a grain husking machine as clearly illustrated, described and claimed in Mexican Pat. No. 133,323 or Spanish Pat. No. 468,130 which are mentioned herein for reference purposes.

Figure 9:
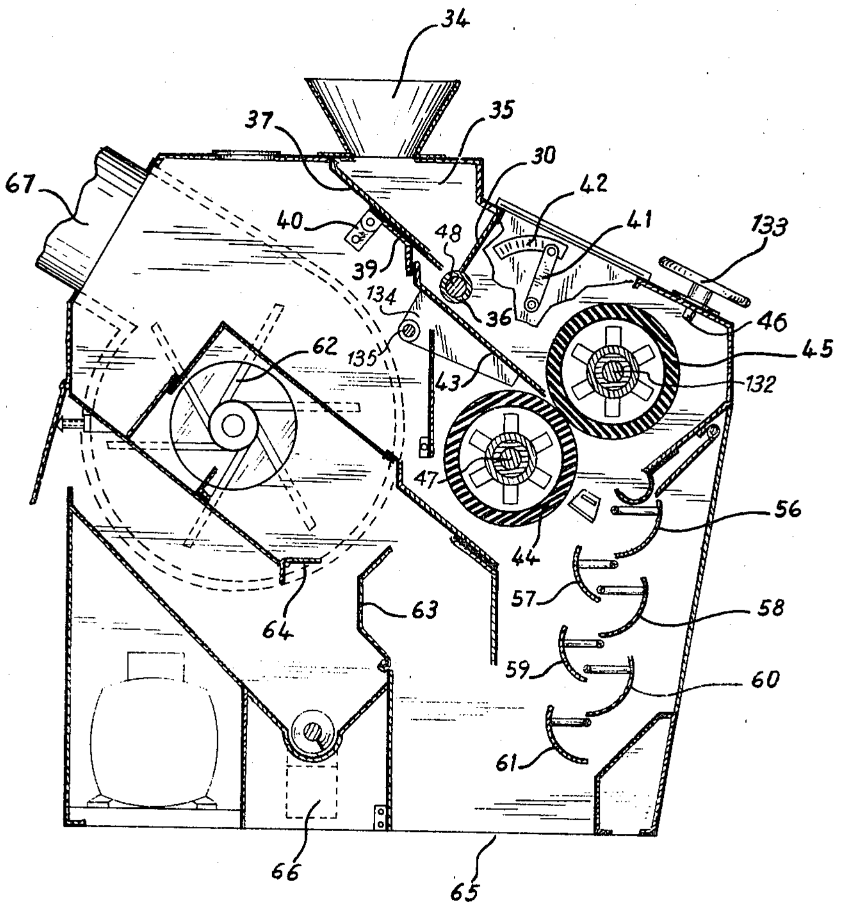
FIG. 9 is a cross-sectional side elevational view of a rice husking machine preferred for use with the fully pneumatic rice mill built in accordance with the present invention.
Figure 10:
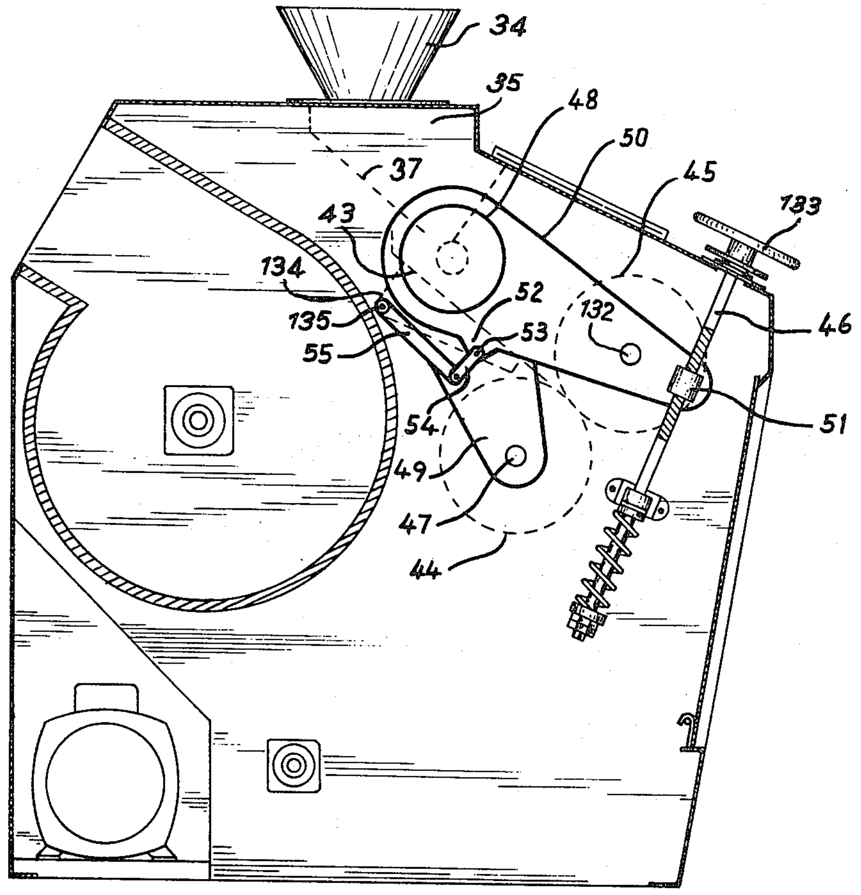
FIG. 10 is a cross-sectional side elevational view of the rice husker shown in FIG. 9, but taken at a different section to show different details.

The grain husking machine in accordance with said Mexican and Spanish patents, as shown in FIGS. 9 and 10, briefly comprises an open mouth 34 which provides for an anti-choking action within the machine because it permits the overflow of grain out of the machine when the grain fed thereto is in excess of its capacity, and an inclined plate 37 forming a reception chamber 35, said inclined plate 37 being continued at its lower end by a sliding plate 39 having the same slope as plate 37 and useful, when moved, to close or open the space between the plate and a feeder roller 36 rotating about an axle 48. A further oppositely inclined plate 30 completes the reception chamber 35, to permit only the passage of grain between the lower edge of plate 39 moved by mechanism 40 and the surface of roller 36.

The reception chamber 35 is not conical as is usual in this type of husking machines, but on the contrary, is an elongated chamber of a triangular cross-section, with its lower apex extending throughout the width of the machine, in order that the passage of grain between the lower edge of plate 39 and the roller 36 be in the form of a one grain thick layer for a purpose to be described hereinbelow. The lever system 40 for actuating the sliding plate 39 is actuated by means of a crank 41 moving along the index 42 located outwardly of the machine.

An inclined plate 43 is provided below plate 39 and roller 36, said plate 43 having several functions, namely, it receives the grains falling thereon practically in a one grain thick layer in view of the cooperating action of roller 36 with plate 39 as described above, it guides the grains to the nip of the husking rollers 44 and 45, it forces the grains to lie down and advance on said plate 43, and it spaces the grains between each other such that they will pass in a single layer to the nip of the husking rollers. This spacing of the grains in the falling layer is accomplished by the effect of the acceleration caused thereon by gravity, which forces the grains to increase their speed while they advance over the surface of plate 43.

At the lower edge of plate 43 a pair of husking rollers 44 and 45 is arranged, mounted on shafts 47 and 132, respectively, and arranged in an inclined fashion one to the other, such that a line drawn through the center lines of the axles 47 and 132 will form an angle slightly higher than 90° with the surface of plate 43. This arrangement forces the grain to lie down or flatten before passing between the nip of the rolls, which prevents the grains to be trapped between their sharp edges, and avoids to a large extent the breakage of the grains between the rollers 44 and 45.

The pressure of the nip of the rollers 44 and 45 is generally lower than in other types of known husking machines, because of the fact that the husk has been loosened already by the prehusking action of sifter 6 described above. The rollers 44 and 45 have a lining of an elastomeric hard material to rub the grains without substantial breakage thereof, and the rotation of the roller 44 and 45 is effected at a different speed, such that while the roller having the higher speed pushes the grain, the roller having the lower speed retains the same, thereby producing a rubbing and disrupting action on the husk of the grain which therefore is removed therefrom.

As the faster moving roller is worn out in a time shorter than the other one, the husker in accordance with the embodiment illustrated in FIGS. 9 and 10 of the drawings may be arranged such that one roller may be brought near to the other radially, and this generally causes the ramp 43 to remain out of alignment with the nip of the rollers.

Therefore, an automatic adjusting mechanism is provided in this husking machine, which comprises a fixed axle 47 to support the lower roller 44 while the upper roller 45 is mounted on a movable axle 132, mounted on a structure formed by two articulated levers 49 and 50 (FIG. 10 of the drawings). The lever 49 is supported on the fixed axle 47 of roller 44 and the articulation between the two levers 49 and 50 is effected by fastening to the inner wall of the machine the axle 132 which also supports the axle 48 of the roller 36. The lever 50 is engaged, by means of a threaded bushing 51, to the screw drive 46 operated from the outside of the machine by means of the wheel 133, in order to move the lever 50 up and down as clearly shown in FIG. 10 of the drawings. In this manner, roller 45 may be approached to roller 44 when the wear produces an increase in the gap of the nip between the rollers.

The screw 46, on adjusting the rollers, also effects the necessary adjustments to the slopping plate 43 in order that the latter will always match the nip of the rollers 44 and 45 and, for this purpose, lever 50 has at its lower portion a small lug 52 wherein a pivot 53 fixes a mechanism formed by two small levers 54 and 55, with the small lever 54 being engaged to lever 50 whereas the other small lever 55 is articulated with lever 54 and at its other end with a pivot 135 engaging the bracket 134 to which the inclined plate or ramp 43 is affixed. In this manner, both the ramp 43 and the nip of the rollers 44 and 45 may be adjusted as the wearing action of the grains decreases the diameter of such rollers and such that the ramp 43 be always coincident with the nip of said rollers.

Below the nip of the rollers 44 and 45, a cascade arrangement or sifting chamber formed by curved plates 56, 57, 58, 59, 60 and 61 is provided, in order to receive the grains which thereby form a cascading stream between said plates, and a stream of air is driven by the vanes of the blower 62 provided within the machine, whereby all the husk released from the grains and all the light particles are entrained in the air passing between the cascading arrangement described above, and through the duct 67 out of the machine. The particles heavier than the husk, are also entrained by the stream of air driven by the fan 62, but tend to fall down and are unable to go through the span provided by an articulated detent plate 63, whereby said heavier particles, generally constituted by rice grains of smaller size or broken rice grains, fall again into the sifting chamber to be discharged through the lower outlet 65 together with the husked grains. The particles which are heavier than the husk but still lighter than the rice grains, are again retained by plate 64, and are discharged through duct 66 driven by a screw type conveyor or the like.

The grain polishing and whitening machine incorporated in the mill built in accordance with the embodiment described in FIGS. 1 and 2 of the drawings also forms an important part of this invention and is the subject matter of copending U.S. application Ser. No. 096,269 which is mentioned here for reference purposes. This is the only grain whitening and polishing machine which is capable of completing a husking operation on the grains that were not completely husked by the husking machine 33 described above or any other prior art husker. In other words, common type rice polishing and whitening machines are absolutely inadequate to be used with the mill of the present invention, which requires the use of said specially built type of grain polishing and whitening machine, capable of husking the grains that were left unhusked by the husking machine 33, inasmuch as otherwise a simplified type of rice mill as that shown in the embodiment of FIGS. 1 and 2, would not be possible.

The grain whitening and polishing machine incorporated in the mill built in accordance with the embodiment shown in FIGS. 1 and 2 of the drawings is clearly illustrated in FIG. 11 thereof, and preferably comprises a lower rectangular housing 93 and an upper vertical cylindrical housing 70, 71, a hollow shaft 74 mounted by means of bearings on a support 85 in turn supported by housing 70, 71, said hollow shaft being engaged to a pulley 91 within housing 93, and having belts 90 connected to the respective pulley of motor 88 (FIG. 2) in order to provide the necessary rotative movement. Hollow shaft 74 has, at its upper part and concentrically arranged outwardly thereof a screw type vertical conveyor 73 which has the upper face of the threads thereof lined with an abrasive material, and is engaged upwardly thereof to a perforate cylindrical member 75, having at least two diametrically opposit knives 76 which are engaged diagonally such that the materials received thereby are pushed upwardly throughout the machine.

A feed hopper 69 is provided such that it delivers the husked rice from the husking machine 33 into the chamber wherein the screw type conveyor 73 rotates, whereby said conveyor will exert a high abrasive action on the grains, thereby husking all the grains that were not husked by the husking machine 33, and thereafter the grains are delivered upwardly to be acted upon by the perforate cylinder 75, and a special type of screen 77 is provided outwardly of said cylindrical member 75, forming a chamber therebetween wherein the grains are treated for polishing and whitening purposes. To this effect, screen 77 has a plurality of indentations directed radially inwardly, which rub the grains against each other and against the screen 77, releasing the surface material which comprises flour and bran. All the released material will pass through the holes of screen 77 into the chamber 83 as will be described hereinbelow. The completely husked, whitened and polished grains are pushed upwardly into the frustoconical member 78, and the material pushed upwardly will in turn push the lid 79 against the action of the weight 80 supported by the lever system 81 to force the lid 79 to open, whereby said material will be discharged through the chute 82, to fall within the bag 147 (FIGS. 1 and 2) or, for the other embodiments of the invention, into a duct 94 wherein a pneumatic conveyor 141 will transport the same to other units for further treatment.

A fan 92 is provided within housing 93 and engaged to the pulley 91 of hollow shaft 74, so as to force a stream of air inwardly of housing 93, through the hollow shaft 74, outwardly through the holes of the perforate cylindrical member 75, through the grain under treatment, outwardly of the perforations of the screen 77 into chamber 83, entraining all the light materials released from the grain such as husk, flour and bran, downwardly to chamber 84 and outwardly of the device through duct 86 (FIG. 2), to be thereafter taken by a pneumatic conveyor regulated by the damper 87, to other places in the premises for further treatment and purification.

The cyclonic separator 96 used to extract all the released material from the grain sifter 6 of the mill built in accordance with the embodiment of FIGS. 1 and 2 of the drawings may be selected from any known type of cyclonic separator but, in view of the fact that the husk and dust released from the grain by the sifter 6 tends to adhere to the walls of the cyclon 96, it is preferred to provide this cyclon as a non-sticking cyclon of the type described and claimed in copending U.S. application Ser. No. 06/128,785, which is mentioned herein for reference purposes.

Such as it is clearly shown in FIG. 12, the cyclonic separator 96 built in accordance with the above identified copending U.S. application and preferred for use with the mill of the present invention, comprises a fan 97 acted by means of an electric motor 98, and is provided with an outlet 144 for air, which is sucked into the fan 97 through the vertical duct 104, so as to provide an induction type cyclonic action.

The cyclon itself comprises an upper frustoconical body 100 and a lower frustoconical body 101, the larger end of the frustoconical body 100 being introduced downwardly of the larger end of the frustoconical body 101, such as clearly shown in FIG. 12 of the drawings, a distance 102 below its upper edge, thus leaving a space 103 between the wall of the frustoconical body 101 and the wall of the frustoconical body 100, whereby the section 102, the wall of the body 101 and an annular lid 105 arranged between the upper and lower bodies, will form a chamber through which air may be sucked from the outside. The lid 105 is provided with a plurality of holes 106, which may be plugged as shown in FIG. 10, in any desired amount in order to control air sucked by the fan 97, which air materially sweeps the inner surface of the body 101, and an inlet 99 is provided for the particle ladden air, whereby the particles, as is well known in the art, will be centrifugally separated from the air and will be expelled by the frustoconical body 100 unto the inner surface of the lower frustoconical body 101. However, as streams of air are being sucked inwardly of the device through holes 106, these streams of air will sweep the inner surface of said body 101 thus preventing the particles falling thereon from adhering thereto, whereby said particles are fully recovered through the lower mouth of the device to be discharged by means of the air separator 107 (FIG. 1) as described above. This type of cyclon prevents any adherence of the materials separated from the air and constitutes a very valuable unit for use in the mill in accordance with the present invention.

The rice mill built in accordance with the embodiment described in connection with FIGS. 1 and 2 of the drawings, as mentioned above, is a highly simplified type of mill, which may be used either for working at the site of the crop or for a permanent installation in those countries wherein the size distribution and the quality of the rice is not of the utmost importance, because of course, as this mill has no classification systems, all the sizes of the rice including some broken rice grains, will be contained in the product, and a few paddy grains (unhusked rice) may also be some times extent in the finished product, whereby again this simplified type of mill is suitable only for those countries where there are no strict requirements as to the quality of the rice for human consumption.

The rice mill built in accordance with the second embodiment of the invention comprises the same units as the simplified rice mill illustrated in FIGS. 1 and 2, namely, the feed hopper 2, antichoke valve 4, the sifter 6, the air separator 16, the vibrating sieve 22, the husking machine 33, and the grain whitening and polishing machine 68, but instead of having the discharge of said rice polishing and whitening machine 68 directed to the packaging station 147, the said discharge of the polished and whitened rice is made to a duct 94, connected with a pneumatic conveyor 141, which leads the polished and whitened grain to a second sifter 95, built identically as sifter 6, wherein the polished and whitened rice is completely polished and whitened, and the flour and bran separated therefrom is fed through a line 142 to the inlet duct 143 of the cyclonic separator 96. From this cyclonic separator 96, the flour and bran are discharged through the air separator 107, for appropriate packaging, together with the flour and bran produced by the said whitening and polishing unit 68, which is also received in the cyclonic separator 96 through lines 86 and 143.

The completely cleansed, polished and whitened rice is discharged through the air separator 108 of sifter 95 to a second sieve 109 identical with sieve 22 previously described, which sieve 109 receives the grain through its mouth 145 and discharges the waste materials to a disposal duct whereas the completely cleaned grain is fed to a grain classifying unit 110 through its mouth 111, said grain classifying unit 110 being capable of separating the rice in three different sizes, in order to produce three different classes of rice, each with a uniform size, which are thereafter fed to a series of bins 146 for further packaging thereof.

The cyclon connected to the first sifter which works as a prehusking apparatus 6, in the particular instance of this embodiment of the invention, may be a common type cyclon 15, being driven by means of a fan 19 in turn driven by the motor 20, and a transparent section 121 may be inserted above the air separator 21 which delivers the husk to duct 138 for further disposal purposes. This transparent section 121 may be used for inspection purposes in order to ascertain that no substantial amounts of grain is passing into the cyclonic separator 15.

Figure 3:
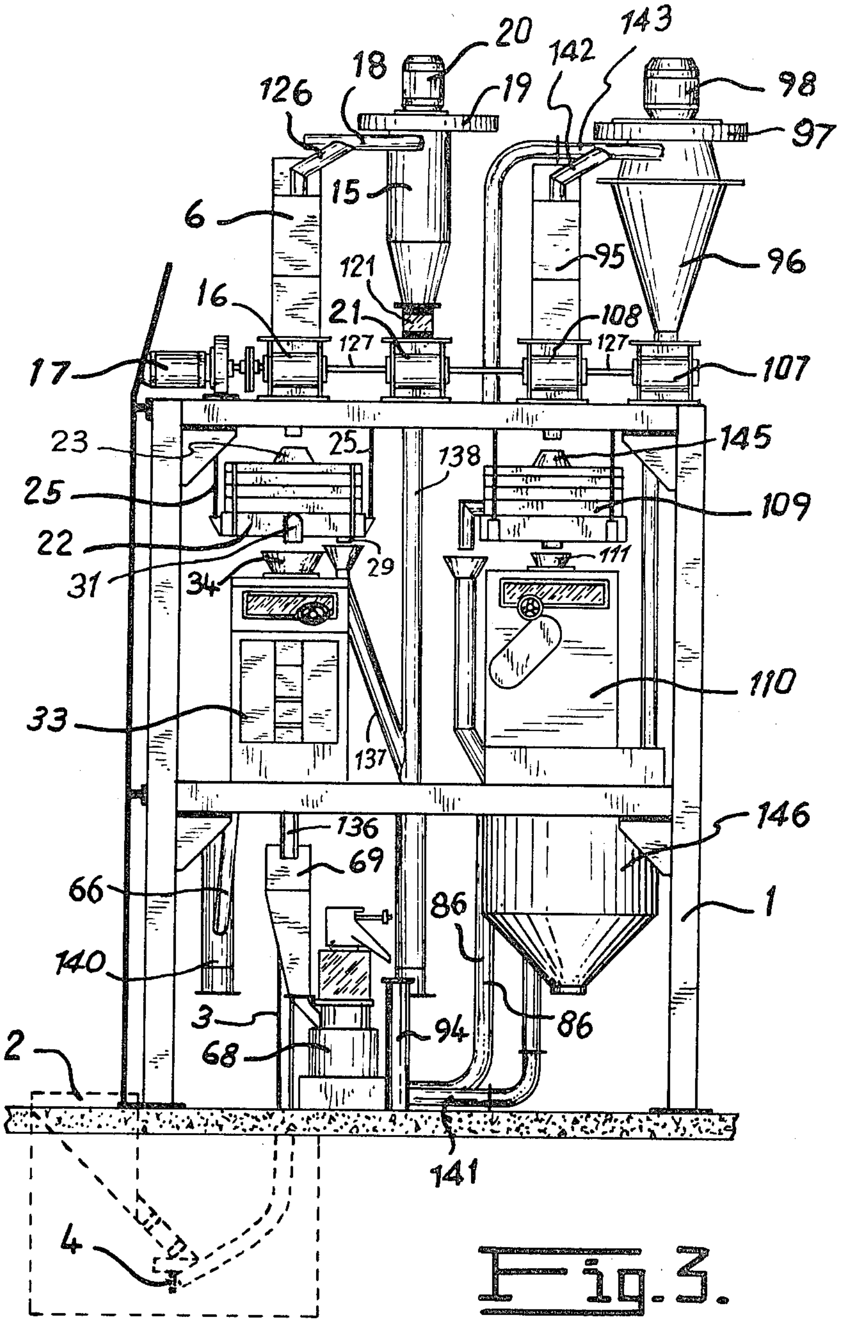
FIG. 3 is a front elevational view of a fully pneumatic rice mill capable of classifying the grain in various sizes and built in accordance with a second embodiment of the present invention.
Figure 4:
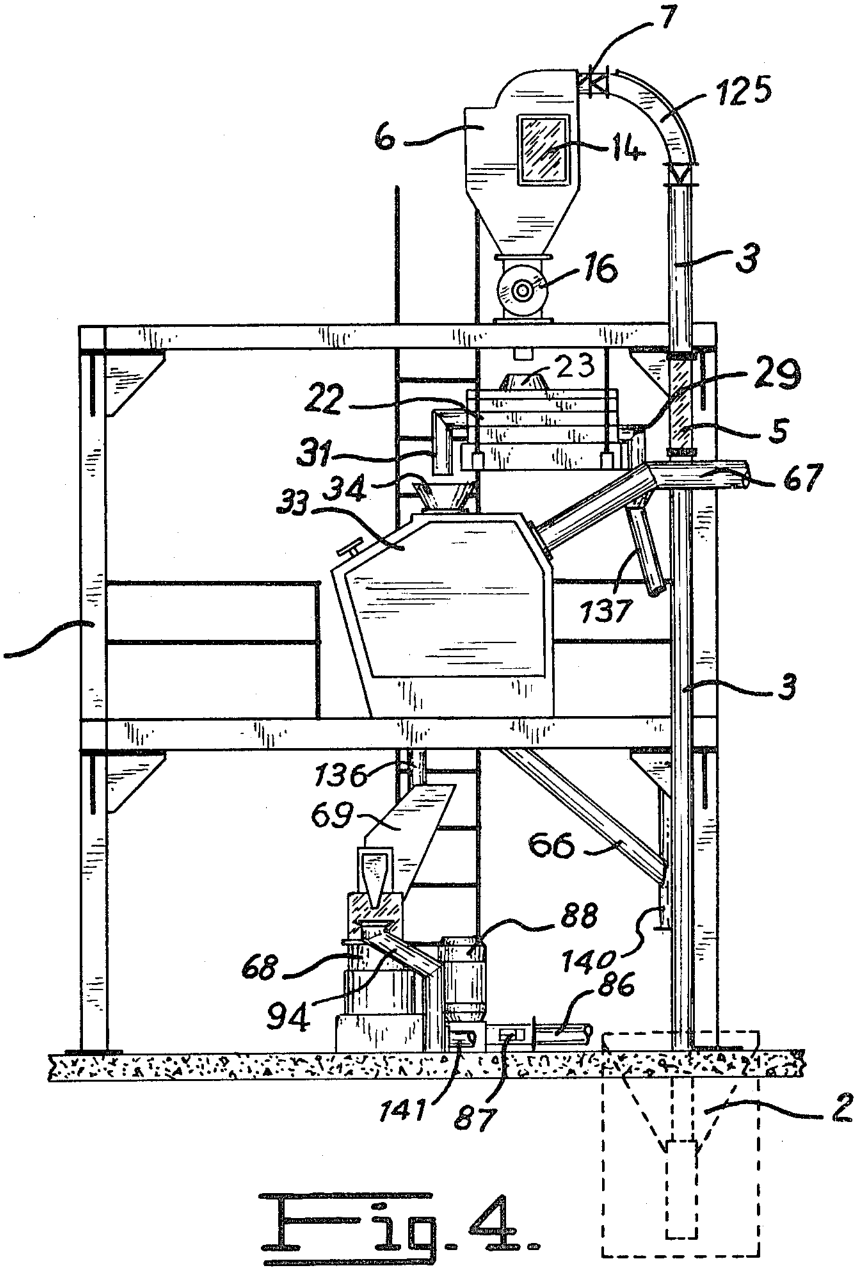
FIG. 4 is a side elevational view of the rice mill illustrated in FIG. 3 and taken at an angle of 90° with respect thereto.
Figure 13:
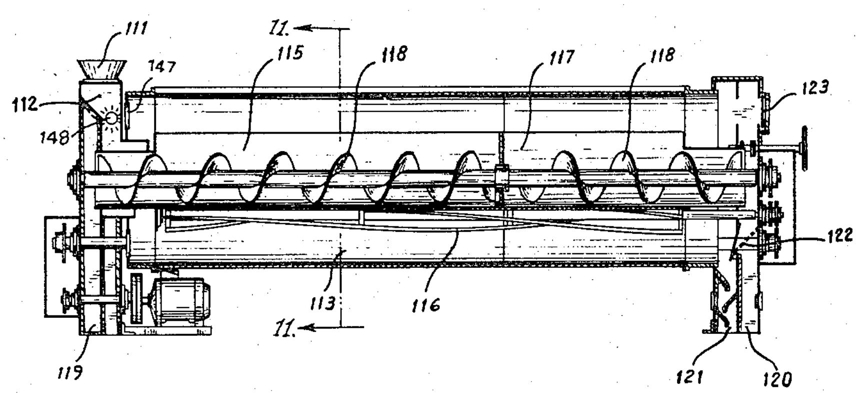
FIG. 13 is a cross-sectional side elevational view of a rice classifying machine for use with the mill built in accordance with the present invention.
Figure 14:
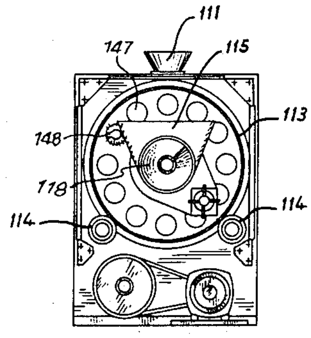
FIG. 14 is a front elevational view of the rice classifying machine illustrated in FIG. 13.

The above described units constituting the mill built in accordance with the embodiment shown in FIGS. 3 and 4 are exactly the same as those already described in connection with the embodiment of FIGS. 1 and 2. The grain classifying unit 110 incorporated in said mill, in turn, may be of any known type but is preferably as that described and claimed in Mexican Pat. No. 173,161 and Spanish Pat. No. 475,333 which are mentioned herein for references purposes and a brief description thereof is incorporated herein in connection with FIGS. 13 and 14 of the drawings.

The polished and whitened grains from sieve 109 are charged into the rice classifier 110 through its inlet chute 111, to pass into the space 112 to lead the same to a wide rotatory cylinder or drum 113, said drum 113 having all its inner surface provided with a plurality of small cavities (not shown) having different depths, with the shallower cavities being near the entrance 111 and those of the larger depth being near the outlet 120, 122 of the classifier.

When the rice grains pass from the bin 112 into the cylinder 113, rotation of the latter forces the grains to enter into the cavities and, as those near the entrance 112 are shallower than those at the other end of the machine, the larger grains project outwardly of said cavities and, when the drum 113 rotates, said larger grains displace their center of gravity outside of the cavity as the latter is raised, whereby the grains fall down when they have been scarcely elevated by the rotation of the drum 113. The smaller grains, however, remain with the cavities longer and are brought to a higher position of the drum when the latter rotates, whereby they will fall from said drum nearer to the center, being received by a channel 115 which extends midway of the length of the device.

The smaller grains which fall within the channel 115 are taken back by means of a screw type conveyor 118 placed within the channel 115 and are discharged from the machine through the outlet 119. The larger grains which fall outside of the channel 115 as described above, are again taken by the drum 113, near the bottom of which there is a ribbon conveyor 116 which drives the grains towards the end having the exit 120, 121. From the end of channel 115, a further channel 117 is provided with a screw type conveyor 118 having an opposite flight from that of conveyor 118 within the channel 115, whereby, through the same type of operation described above, the intermediate size rice is pushed upwardly by the larger cavities of the last third portion of the drum 113 into channel 117 and, from said channel, the screw conveyor 118 pushes intermediate size grains towards the end of the drum and discharges them through either the outlet 120 or the outlet 121, depending on the position of the damper 122. Normally, the damper 122 will be in the position marked by a full line in FIG. 13 of the drawings, whereby the intermediate size grain will be discharged from the classifier through the chute 120.

The largest grains, that have not been taken up by the cavities provided throughout the surface of the drum 113, remain in said drum and are discharged, by the bias of the ribbon conveyor 116, through the chute 121 outwardly of the classifier. The damper 122 may be also used for effecting any combination of the intermediate and largest size of grains, in order to satisfy the needs of the particular market.

The appropriate operation of the machine may be inspected through the window 123 against the light 148 which throws its rays through the window 147, so that the operation of the machine may be closely controlled by the operator.

The rotating drum 113 may be rotated by any known means but preferably is rotated by the drive of a motor as shown, which in turn drives, by means of a suitable transmission, the wheels 114 which are generally made of a non-skidding material to effect an effective rotation of the drum 113.

Figure 5:
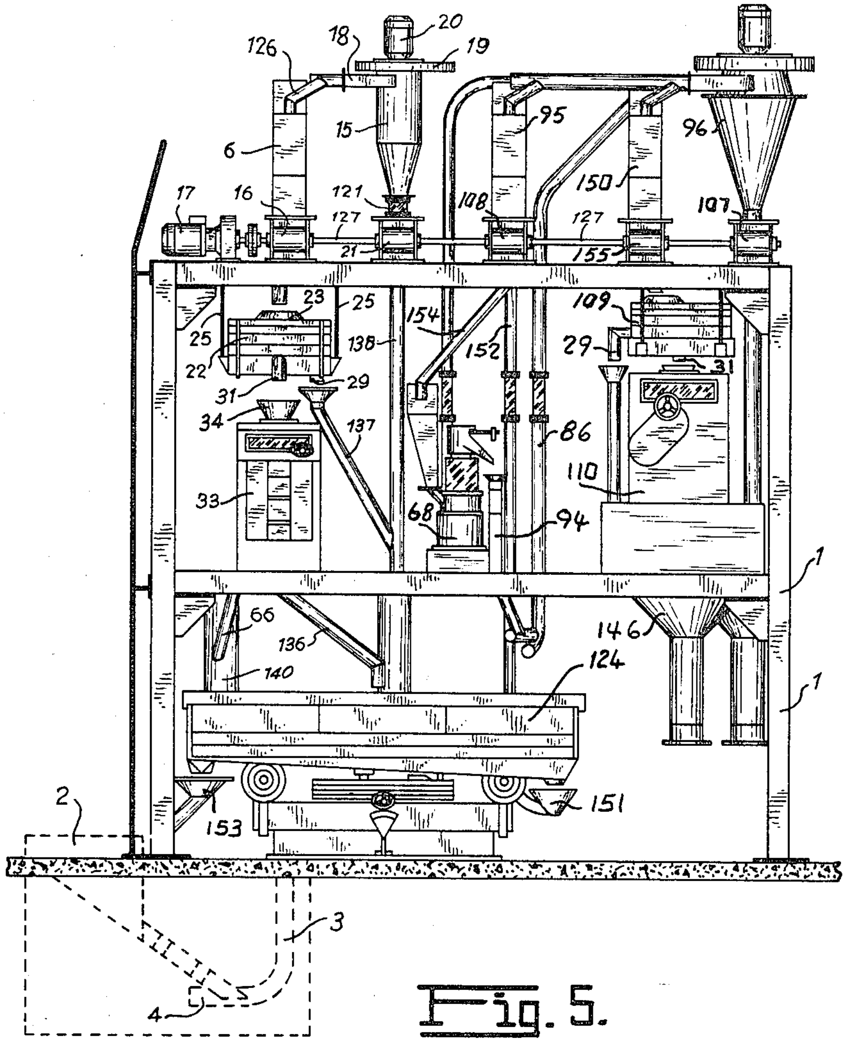
FIG. 5 is a front elevational view of a rice mill built in accordance with a third embodiment of the present invention and capable of classifying the grain into several sizes and also capable of completely removing the paddy from the husked grain.

Finally, as clearly shown in FIG. 5 of the drawings, the rice mill built in accordance with the present invention may also be provided with a paddy table or paddy separator 124, in order to satisfy the needs of the most strict markets of rice, and the flow of the rice within this complete mill would be from hopper 2 through pneumatic conveyor 3 upwardly to the sifter 6, where the rice is prehusked and the dust and husk released are taken by duct 126 into the inlet 18 of cyclon 15 driven by the fan 19 in turn driven by motor 20. The rejects, which may be inspected through the transparent portion 121, are taken by the air separator 21 and down to disposal through the duct 138.

The grain from the sifter 6, is discharged by the air separator 16 into the sieve 22, wherein again the rejects are discharged through chute 29 into the pipe 137 which goes to the duct 138 mentioned above. The already cleaned grain leaves the sieve 22 through the chute 31 into the mouth 34 of the husking machine 33 which husks the grains and sends the husk to the disposal system of the mill as described above, whereas the husked grains, instead of being conveyed directly into the rice polishing and whitening machine 68 shown in FIGS. 3 and 4 of the drawings, are discharged through chute 136 into the paddy table 124, wherein a full paddy separation is effected, the removed paddy being received in chute 153 back to the feed hopper 2, whereas the completely cleaned rice is discharged from the paddy table 124 into the chute 151 wherein a pneumatic conveyor 152 leads it to a second sifter 95, wherein it is again completely cleansed and partially polished, the bran and flour released from the grain being taken by the cyclonic separator 96 to an appropriate place in the mill for further treatment or packaging, whereas the cleansed rice is taken by the air separator 108 through duct 154 into the rice whitening and polishing machine 68 described above. From this machine, the polished and whitened rice falls into chute 94 to be again taken off by the penumatic conveyor 86 to a third sifter 150, whereas the flour and bran released from the rice in the whitening and polishing machine 68 are taken by an appropriate duct directly into the cyclon 96, for combination with the bran released from sifter 95, for packaging or further treatment thereof, said flour and bran being delivered to said further treatment system or packaging by the air separator 107 located at the bottom of the cyclon 96.

The sifter 150 furtherly removes all the adherent flour and bran that may have been left on the surface of the rice by the machine 68, and furtherly polishes the grains, with the flour and bran released from said sifter 150 being taken again into the cyclon 96 to be combined with the other streams of flour and bran described above, and the whitened and polished rice is taken by the air separator 155 into the second sieve 109, the rejects being discharged through chute 29, whereas the cleansed and classified rice falls into the grain classifier 110 through chute 31, and the different sizes of rice, upon classification as described above, are distributed amongst several bins 146 for further packaging thereof.

From the above it may be thus be seen that for the first time a fully pneumatic rice mill has been provided, with all the conveyance of both the grain and the by-products and waste materials being made by means of pneumatic conveyors exclusively, which is rendered possible by virtue of the insertion, in the system, of one or more sifters which decelerate the grain considerably without any appreciable breakage and at the same time clean the same either from the husk when they are fed as paddy or from the adherent flour and bran when they are fed as partially treated rice as clearly described in connection with FIGS. 1 2, 3, 4 and 5 of the drawings.

It will be quite apparent to any one skilled in the art that the arrangement of the various units of equipment forming the rice mill in accordance with any one of the embodiments of the present invention, may be changed from vertical to horizontal, inasmuch as all the said units of equipment, namely, the sieves, husker, polisher and whitener, paddy table, classifier and storage bins may be placed on a lower floor and only the sifters and the cyclonic separators may be located above and lower floor, whereby the maintenance of the equipment may be highly facilitated, in view of the fact that handling of materials, repair parts and services or maintenance of the machinery in an upward direction is absolutely avoided. Therefore, this horizontal arrangement, while not shown, will be obvious from the teachings of the present application, whereby it is desired that the scope of the invention also include this type of horizontal arrangement.

The air movers for the pneumatic conveyors used in the mills of the present invention may be of the positive acting type or may be centrifugal fans, and these systems may also use pumps or blowers for high pressure handling of the air, either to carry out forced conveyance (under pressure) of the materials whithin the mill, or to carry out an induced conveyance thereof, (under vacuum) as will be apparent to any one skilled in the art.

The positive action pumps or high pressure blowers are particularly useful for very large installations where the number of units is large and wherein therefore it is always convenient to keep the power as low as possible. These pumps permit the use of a smaller diameter piping wherein the handling of the materials through the pneumatic system may be effected at a high pressure produced by these high pressure blowers or positive action pumps.

The incorporation, in a rice mill, of the pneumatic conveyors and the sifters built in accordance with the present invention, as well as the appropriate selection of the grain polishing and whitening unit as one having capability of furtherly husk the unhusked or partially husked grain, enables the erection of a rice mill which is much smaller than prior art rice mills designed for the same capacity of finished product, with a power consumption per ton of processed rice of less than half than that of the most efficient prior art rice mills, with a maintenance and repair cost of only around 20% of the cost of maintenance and repair of prior art mills and with a much better simplicity of operation and handling of materials therein.

The rice mill of the present invention, in its simplified design, may be operated by non qualified operators and, therefore, is ideal to be mounted at the site of the crop for operation by the farmers themselves, contrary to the simplest of the prior art rice mills that require highly qualified personnel for operation thereof.

Although certain specific embodiments of the present invention have been shown and described above, it is to be understood that many modifications thereof are possible. The present invention, therefore, is not to be restricted except insofar as is necessitated by the prior art and by the spirit of the appended claims.

What I claim is:

1. In a rice mill comprising grain feed means, grain husking means for husking grain delivered by said grain feed means, grain polishing and whitening means connected to a discharge of said grain husking means, and pneumatic cyclonic separator means for collecting husk, flour and bran released from the grain, the improvement comprising:

first pneumatic grain conveyor means for pneumatically conveying grain from said grain feed means to said grain husking means and from said grain husking means to said grain polishing and whitening means;

first grain decelerator and abrading pneumatic sifter means arranged to receive a discharge from said pneumatic grain conveyor means; and first vibrational sieve means arranged to receive grain from said grain decelerator and abrading pneumatic sifter means and to discharge screened grain to said husking means;

said first grain decelerator and abrading pneumatic sifter means comprising:

a housing having an inlet for air and entrained grain, an outlet for sifted grain, and suction duct means connected to said pneumatic cyclonic separator means for driving air through said housing;

adjustable plate means being disposed within said housing, said adjustable plate means being mounted at a level slightly below said inlet for air and entrained grain and being movable to narrow or broaden said inlet;

first curved abrasive lined plate means being disposed within said housing and arranged with a concave abrasive lined portion thereof facing said inlet past said adjustable plate means;

second curved abrasive lined plate means being disposed within said housing, said second curved plate means being arranged below said first curved plate means and having a curvature opposite that of said first curved plate means;

a plurality of third curved abrasive lined plate means arranged in a cascading array below said second curved plate means; and air separator means arranged at a bottom of said sifter means;

an arrangement of said first, second and third curved abrasive lined plate means being such that said grain slides thereon in a cascade type path and is swept by the air and therefore sifted thereby so that said grain is heavily abraded and decelerated as said grain moves down said cascading array of said first, second and third curved abrasive lined plate means which prevent said grain from impacting against any hard surface.

2. The rice mill as claimed in claim 1 wherein said first pneumatic grain conveyor means comprises:

first duct means extending from said grain feed means to said grain decelerator and abrading sifter means;

first cyclonic separator means;

second duct means extending from a suction duct of said grain decelerator and abrading sifter means to said first cyclonic separator means; and air driving means connected to said first cyclonic separator means.

3. The rice mill as claimed in claim 2 wherein said first cyclonic separator means is an induction type cyclon comprising:

a lower frustoconical body;

an upper frustoconical body having its lower larger edge inserted downwardly into an upper larger edge of said lower frustoconical body;

an annular lid attached to said upper and said lower frustoconical bodies to close a gap therebetween;

suction duct means centrally arranged at a top of said upper body, outlet means arranged at a bottom of said lower body; and a plurality of pluggable openings located throughout a circumferential center line of said annular lid, whereby streams of air are introduced to sweep an inner surface of said lower body and flow outwardly of said lower edge of said upper body to produce an air cushion which avoids adherence of particles on said lower body.

4. The rice mill as claimed in claim 3 wherein said grain whitening and polishing means includes a cylindrical chamber having a screw type conveyor therein, a flight of said conveyor being lined with abrasive material on its forward face to produce a heavy abrasion of incoming grain to further husk said incoming grain.

5. The rice mill as claimed in claim 1 further comprising:

grain size classifying means connected to a discharge of said grain polishing and whitening means;

second pneumatic grain conveyor means arranged to receive a discharge of said grain polishing and whitening means;

second grain decelerator and abrading pneumatic sifter means arranged to received a discharge from said second pneumatic grain conveyor means; and second vibrational sieve means arranged to receive polished and whitened grain from said second grain decelerator and abrading pneumatic sifter means and to discharge screened, polished and whitened grain to said grain size classifying means.

6. The rice mill as claimed in claim 5 wherein said first pneumatic grain conveyor means comprises:

first duct means extending from said grain feed means to said first grain decelerator and abrading sifter means, first cyclonic separator means, and second duct means extending from a suction duct of said first grain decelerator and abrading pneumatic sifter means to said cyclonic separator means; and said second pneumatic grain conveyor means comprising:

third duct means extending from said grain polishing and whitening means to said second grain decelerator and abrading pneumatic sifter means, second cyclonic separator means, and fourth duct means extending from a suction duct of said second grain decelerator and abrading pneumatic sifter means to said second cyclonic separator means, and air driving means connected to said first and second cyclonic separator means.

7. The rice mill as claimed in claim 6 wherein said second cyclonic separator means comprises:

a lower frustoconical body;

an upper frustoconical body having its lower larger edge inserted downwardly into an upper larger edge of said lower frustoconical body;

an annular lid attached to said upper and said lower frustoconical bodies to close a gap therebetween;

suction duct means centrally arranged at a top of said upper body;

outlet means arranged at a bottom of said lower body; and a plurality of pluggable openings located throughout a circumferential center line of said annular lid;

whereby streams of air are introduced to sweep an inner surface of said lower body and flow outwardly of the lower edge of said upper body to produce an air cushion which avoids adherence of particles on said lower body.

8. The rice mill as claimed in claim 5 wherein said grain whitening and polishing means includes:

a cylindrical chamber having a screw type conveyor therein;

a flight of said conveyer being lined with abrasive material on its forward face to produce a heavy abrasion of incoming grains to further husk said incoming grains.

9. In a rice mill comprising grain feed means, grain husking means for husking grain delivered by said grain feed means, paddy separating means for separating a paddy from the husked grain and delivering it to said feed means, grain polishing and whitening means for receiving the grain from said paddy separating means, grain size classifying means, and pneumatic cyclonic separator means connected to a discharge of said grain polishing and whitening means for collecting husk, flour and bran released from the grains, the improvement comprising:

first pneumatic grain conveyor means;

first grain decelerator and abrading pneumatic sifter means arranged to receive a discharge from said first pneumatic grain conveyor means;

first vibrational sieve means arranged to receive grain from said first grain decelerator and abrading pneumatic sifter means and to discharge screened grain to said grain husking means;

second pneumatic grain conveyor means arranged to receive grain from said paddy separating means;

second grain decelerator and abrading pneumatic sifter means arranged to receive a discharge from said second pneumatic grain conveyor means and to discharge sifted grain to said grain polishing and whitening means;

third pneumatic grain conveyor means arranged to receive a discharge from said grain polishing and whitening means;

third grain decelerator and abrading pneumatic sifter means arranged to receive a discharge from said third pneumatic grain conveyor means; and second vibrational sieve means arranged to receive polished and whitened grain from said third grain decelerator and abrading pneumatic sifter means and to discharge screened polished and whitened grain to said grain size classifying means.

10. The rice mill as claimed in claim 9 wherein each said first, second and third grain decelerator and abrading pneumatic sifter means comprises:

a housing having an inlet for air and entrained grain, an outlet for sifted grain and suction duct means connected to said pneumatic cyclonic separator means for driving air through said housing;

adjustable plate means being disposed within said housing, said adjustable plate means being mounted at a level slightly below said inlet for air and entrained grain and being movable to narrow or broaden said inlet;

first curved abrasive lined plate means being disposed within said housing and arranged with a concave abrasive lined portion thereof facing said inlet past said adjustable plate means;

second curved abrasive lined plate means being disposed within said housing, said second curved plate means being arranged below said first curved plate means and having a curvature opposite that of said first curved plate means;

a plurality of third curved abrasive lined plate means arranged in a cascading array below said second curved plate means; and air separator means arranged at a bottom of said sifter means;

an arrangement of said first, second, and third curved abrasive lined plate means being such that the grain slides thereon in a cascade type path and is swept by the air and therefore sifted thereby so that the grain is heavily abraded and decelerated as said grain moves down said cascading array of said first, second, and third curved abrasive lined plate means which prevent said grain from impacting against any hard surface.

11. The rice mill as claimed in claim 10 wherein said pneumatic cyclonic separator means comprises first and second cyclonic separators;

said first pneumatic grain conveyor means comprising first duct means extending from said grain feed means to said first grain decelerator and abrading pneumatic sifter means, and second duct means extending from a suction duct of said first grain decelerator and abrading pneumatic sifter means to said first cyclonic separator means;

said second pneumatic conveyor means comprising third duct means extending from said paddy separating means to said second grain decelerator and abrading pneumatic sifter means, and fourth duct means extending from a suction duct of said second grain decelerator and abrading pneumatic sifter means to said second cyclonic separator; and said third pneumatic conveyor means comprising fifth duct means extending from said grain polishing and whitening means to said third grain decelerator and abrading pneumatic sifter means, and sixth duct means extending from said third grain decelerator and abrading pneumatic sifter means to said second cyclonic separator, and air driving means connected to said first and second cyclonic separators.

12. The rice mill as claimed in claim 11 wherein said second cyclonic separator comprises:

a lower frustoconical body;

an upper frustoconical body having its lower larger edge inserted downwardly into an upper larger edge of said lower frustoconical body;

an annular lid attached to said upper and said lower frustoconical bodies to close a gap therebetween;

suction duct means centrally arranged at a top of said upper body;

outlet means arranged at a bottom of said lower body; and a plurality of pluggable openings located throughout the circumferencial center line of said annular lid;

whereby streams of air are introduced to sweep an inner surface of said lower body and flow outwardly of the lower edge of said upper body to produce an air cushion which avoids adherence of particles on said lower body.

13. The rice mill as claimed in claim 12 wherein said grain whitening and polishing means include a cylindrical chamber having a screw type conveyor therein, a flight of said conveyor being lined with abrasive material on its forward face to produce a heavy abrasion of incoming grains to further husk said incoming grain.

* * * * *